United States Patent [19]
Delavaux

[11] Patent Number: 5,933,437
[45] Date of Patent: Aug. 3, 1999

[54] OPTICAL FIBER LASER

[75] Inventor: Jean-Marc Pierre Delavaux, Lehigh County, Pa.

[73] Assignee: Lucent Technologies Inc., Murray Hill, N.J.

[21] Appl. No.: 08/828,454

[22] Filed: Mar. 28, 1997

[51] Int. Cl.[6] .................................................. H01S 3/07
[52] U.S. Cl. ............................................. 372/6; 372/68
[58] Field of Search ............................. 372/6, 68, 69, 372/70

[56] References Cited

U.S. PATENT DOCUMENTS

| | | | |
|---|---|---|---|
| 4,815,079 | 3/1989 | Snitzer et al. | 372/6 |
| 5,225,925 | 7/1993 | Grubb et al. | 359/341 |
| 5,473,622 | 12/1995 | Grubb | 372/6 |
| 5,530,709 | 6/1996 | Waarts et al. | 372/6 |
| 5,594,747 | 1/1997 | Ball | 372/68 X |

*Primary Examiner*—John D. Lee
*Attorney, Agent, or Firm*—L. H. Birnbaum

[57] ABSTRACT

The invention in one aspect is an optical fiber laser which includes a core having two different dopants. Pump signals having different wavelengths are introduced into the core through the cladding so that each dopant absorbs a different wavelength. In another aspect, the invention is an optical fiber amplifier which is pumped by at least one fiber laser having the two dopants.

23 Claims, 3 Drawing Sheets

OPTICAL FIBER LASER

FIELD OF THE INVENTION

This invention relates to optical fiber lasers, and in particular to doped cladding fiber lasers.

BACKGROUND OF THE INVENTION

Optical fiber lasers have received increasing attention in recent years, particularly as the source for pumping optical fiber amplifiers. Such lasers typically include a core which is doped by an impurity such as Nd ions so that pumping the core through the cladding with a source such as a laser array or broad strip laser causes an absorption by the dopants which results in emission of the energy in another wavelength spectrum allowing lasing to take place in the core when appropriate reflecting means are used. Most popular designs use a core which is doped with Nd ions or Yb ions and is pumped with light having a range of wavelengths of 800–870 nm or 900–960 nm, respectively. Nd -doped lasers have the advantage of low lasing thresholds (typically about 100 mW), but typically exhibit optical conversion efficiencies of only 35–45 percent. Yb-doped lasers typically have conversion efficiencies of 60–75 percent, but have high lasing thresholds, e.g., as high as several hundred milliwatts.

The core could be co-doped with Nd and Yb ions so that one dopant is pumped and the energy is transferred to the other dopant in order to increase the choice of pump wavelength. (See, e.g., U.S. Pat. No. 4,815,079 issued to Snitzer et al, and U.S. Pat. No. 5,225,925 issued to Grubb et al.) It has also been suggested that a plurality of laser sections could be formed in a single fiber with the sections separated by gratings formed in the fiber. (See, e.g., U.S. Pat. No. 5,473,622 issued to Grubb.) It has been further suggested that more than one fiber laser could share a common grating. (See, e.g., of Grubb et al., U.S. patent provisional application Ser. No. 60/026,906, filed Sep. 26, 1996, and DiGiovanni et al., U.S. patent provisional application Ser. No. 60/026,907, filed Sep. 26, 1996.)

In spite of such suggestions, there still exists the need for high efficiency and low lasing threshold in fiber lasers.

SUMMARY OF THE INVENTION

The invention in one aspect is an optical fiber laser comprising a core surrounded by a cladding, the core including two different dopants. The laser further includes means for introducing into the cladding pump signals of two different wavelengths, the dopants and wavelengths being chosen so that each dopant absorbs a different one of the pump signals.

BRIEF DESCRIPTION OF THE DRAWINGS

These and other features of the invention are delineated in detail in the following description. In the drawing.

It will be appreciated that, for purposes of illustration, these figures are not necessarily drawn to scale.

DETAILED DESCRIPTION

Figure 1:
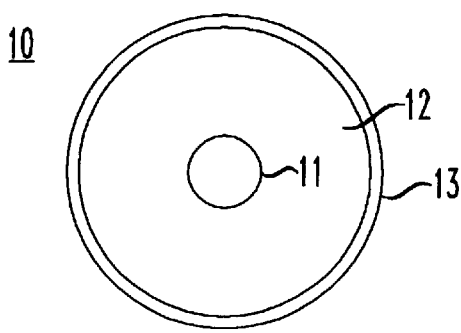
FIG. 1 is a cross-sectional view of a fiber laser in accordance with an embodiment of the invention.

Referring now to the drawings, in which like reference numerals identify similar or identical elements, FIG. 1 illustrates a portion of a typical optical fiber laser, 10, which may be fabricated in accordance with the principles of the invention. The fiber, 10, comprises an active, single mode core, 11, for example, an Nd-doped fused silica where laser light is produced. The core is surrounded by a large multi-mode cladding of fused silica, 12, with an index of refraction less than that of the core. The core size is generally 4–8 microns in diameter and the ratio of the diameter of the multimode cladding to the diameter of the single mode core is typically in the range 10–20. The cladding is surrounded by a layer, 13 to prevent light from propagating out of the cladding. This layer may be made of polymer or low index glass. In accordance with known principles, the core, 11, is doped with ions such that the ions will be excited to higher energy levels when pump light of a certain radiation wavelength is coupled into the single mode core as a result of its propagation in the multimode cladding. Photons are then emitted by the excited dopant ions, and these photons are reflected by a pair of frequency selective mirrors (e.g. Bragg gratings 21 and 22 of FIG. 2) in order to produce laser light oscillation at a specific wavelength characteristic of the dopant species. The cladding may have a variety of shapes as known in the art. (See, e.g., of DiGiovanni, abandoned U.S. patent application Ser. No. 08/561,682, filed Nov. 22, 1995.)

Figure 2:
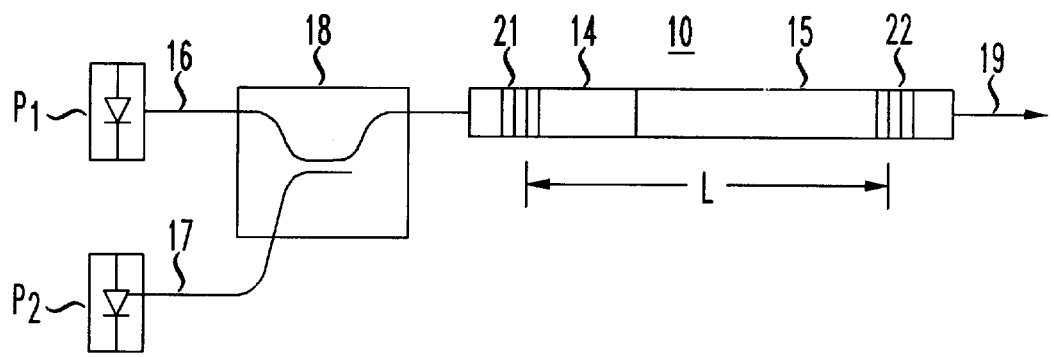
FIG. 2 is a schematic plan view of fiber laser in accordance with the same embodiment.

In accordance with a feature of an embodiment of the invention, as illustrated in FIG. 2, the fiber laser includes at least two contiguous sections, 14 and 15. One section, 14, has a core which is doped with Nd ions, typically having a concentration within the range 100 to 1000 ppm. The other section, 15, has a core which is doped with Yb ions, typically also having a concentration within the range 100 to 1000 ppm. In this example, the first section, 14, has a length within the range 1 to 60 m, and the second section, 15, has a length within the range 1 to 60m. The lengths of the fiber sections will be chosen to optimize the full absorption of the pump laser power. The two sections may be spliced using conventional techniques. The first section, 14, also includes a first reflection means such as a Bragg reflection grating, 21, formed in the core at one end of the fiber, 10, and the second section, 15, includes a second reflection means such as a Bragg reflection grating, 22, formed in the core at the opposite end of the fiber, 10. The gratings are designed to be highly transmitting at the pump wavelengths, yet reflective at the signal wavelengths. The grating, 22, nearest to the end of the fiber functions as an output coupler since it is partially transmitting, having a less than 100 percent reflectivity. The other grating, 21, is preferentially 100 percent reflective so that all the light is reflected toward the opposite grating, 22, forming the oscillator.

In addition to the rare earth dopant, the core of the sections 14 and 15 may also be doped with elements which modify its refractive index. Such index-modifying dopants are generally used for forming the index gratings 21 and 22. Such dopants include germania as $GeO_2$ or $GeCl_4$, phosphorous as $P_2O_2$ and alumina as $Al_2O_3$. In this example, the spacing, L, between the gratings may vary from several meters to several centimeters depending upon the dopant concentration, pump level, and other laser configurations as described below. As described below, the laser structure may have more than the oscillator, and therefore more than one pair of gratings in the core.

Sources of pump signals, $P_1$ and $P_2$, having wavelengths matching the absorption band of the active laser dopants are coupled through optical fibers, 16 and 17, to respective ports of an optical multiplexer, 18. In this example, the pump signal, $P_1$ has a wavelength of 800 nm, and the pump signal, $P_2$, has a wavelength of 940 nm. The output port of multiplexer, 18, is coupled to the cladding, 12, of the first section of the fiber 10. This is referred to as "end-pumping". (However, the pump light may enter the cladding, 12, through the side of the fiber, referred to as "side pumping" (U.S. Pat. No. 4,815,079)). Thus, both pump signals, $P_1$ and $P_2$, are simultaneously coupled into the fiber cladding.

As a result of the pumping of the cladding, the Nd dopant in the core of the first section, 14, will be excited preferably only by the pump signal $P_1$, and the Yb dopant in the core of the second section, 15, will be excited preferably only by the pump signal $P_2$ to cause photon emission from the two sections. This emission is reflected by the Bragg gratings, 21 and 22, resulting in the output of laser light, in this example at a wavelength of approximately 1060 nm, at the output fiber, 19. The output light will exhibit a lower threshold than the typical laser employing only a Yb dopant (expected to be less than 100 mW), but will exhibit a higher conversion efficiency than the typical laser employing only an Nd dopant (expected to be greater than 50 percent.) Consequently, lower thresholds and higher conversion efficiency is achieved in such a structure.

Figure 3:
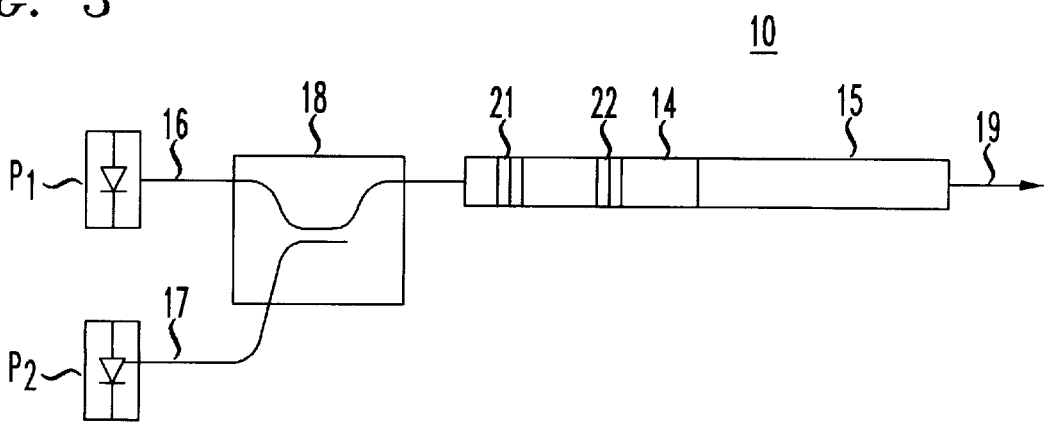
FIGS. 3–9 are schematic plan views of alternative embodiments of the invention.

As illustrated in FIG. 3, the reflection gratings, 21 and 22, need not be at opposite ends of the fiber, 10. Rather, both gratings in this embodiment are located in the first section, 14, and are approximately in the range of a few cm apart.

Figure 4:
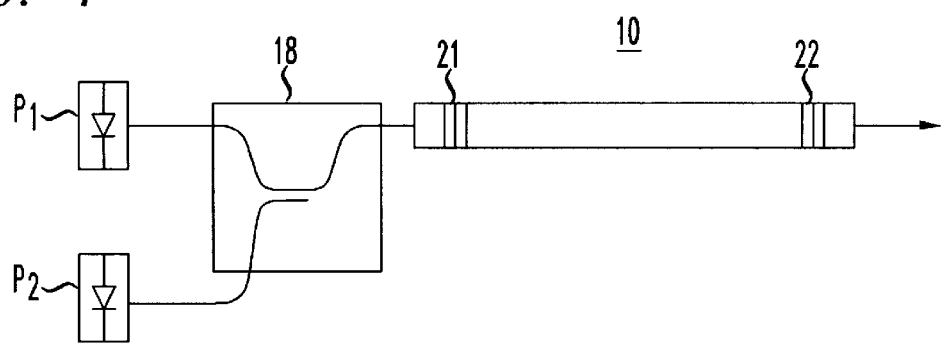
Figure 5:
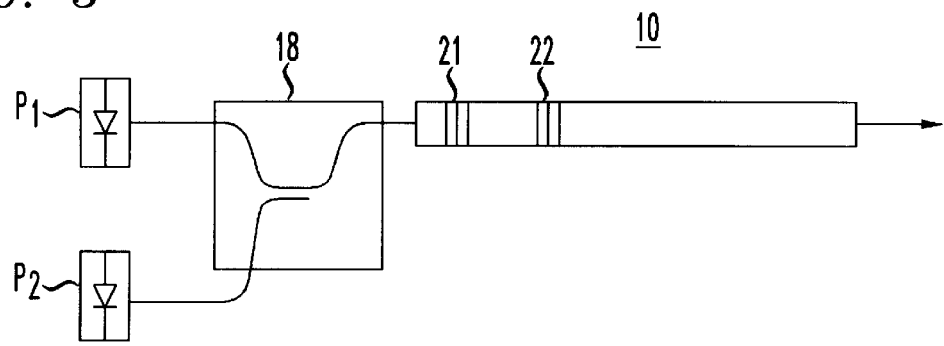

As illustrated in FIG. 4, the fiber, 10, need not be divided into discrete segments. Here, essentially the entire length of the fiber, 10, is co-doped with Nd and Yb ions. Further, as illustrated in FIG. 5, the gratings, 21 and 22, may be placed close together when the fiber is co-doped in a manner similar to the embodiment of FIG. 3.

Figure 6:
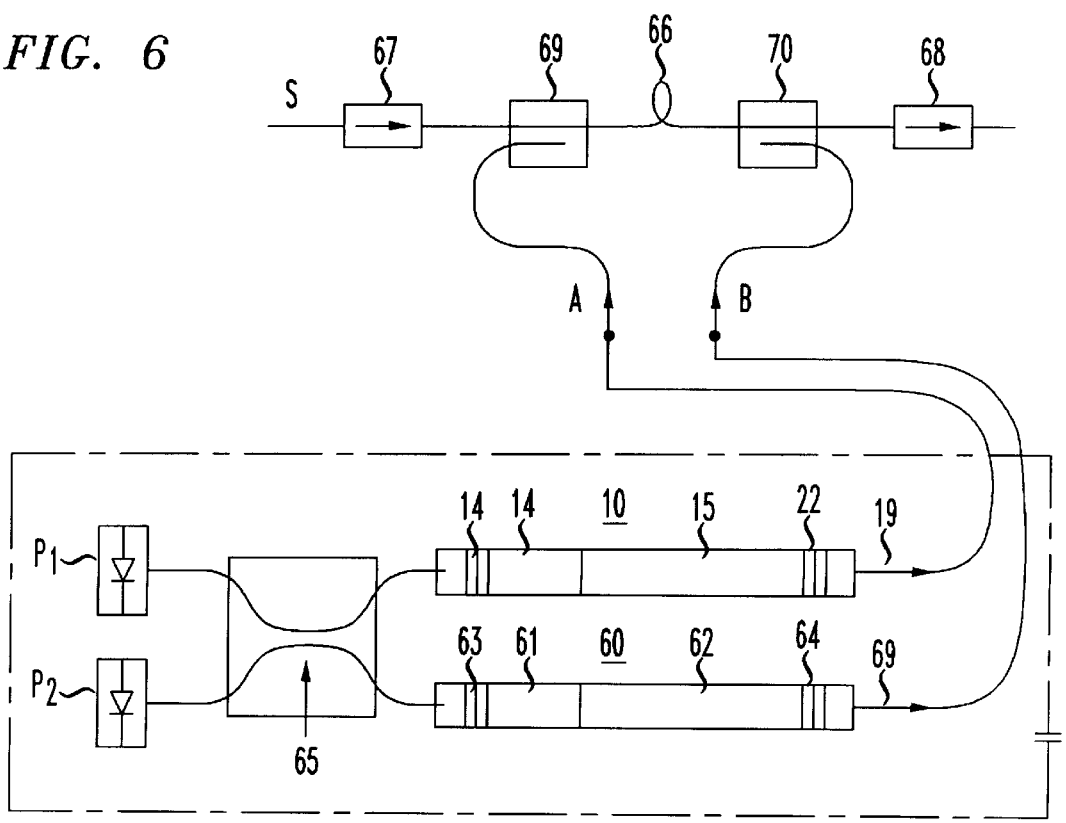

FIG. 6 illustrates an optical fiber amplifier system employing optical fiber lasers according to an embodiment of the invention. In this example, two lasers, 10 and 60, are employed. As before, each laser, 10 and 60, has a first section, 14 and 61, respectively, doped with Nd ions, and a second section, 15 and 62, respectively, doped with Yb ions. Gratings, 21 and 22 and 63 and 64, are formed at the ends of the fiber lasers. Two pump signals, $P_1$ and $P_2$, are coupled to the claddings of both fibers, 10 and 60, by means of a coupler, 65, such as a multimode 3 dB coupler. The outputs, 19 and 69, of the lasers have a wavelength in this example of 1060 nm. Each output is coupled to a respective path, A and B, of the fiber amplifier, which includes a doped fiber segment, 66, and a pair of optical isolators, 67 and 68. The paths, A and B, are coupled to opposite ends of the fiber segment, 66, so that the fiber lasers, 10 and 60, propagate through the segment in opposite directions to amplify the message signal, S.

Figure 7:
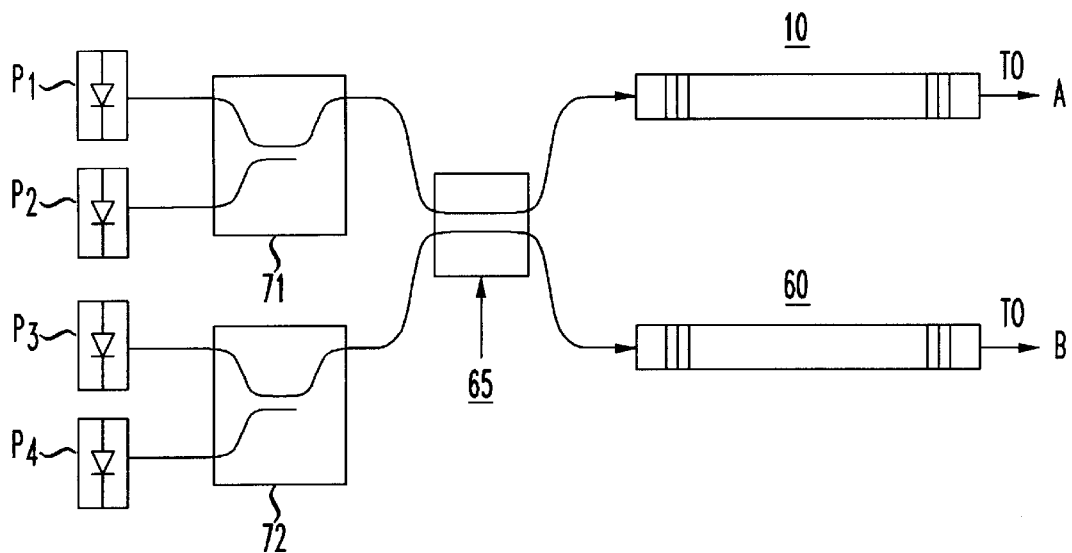

FIG. 7 illustrates an alternative pumping scheme which could be used to pump the fiber amplifier of FIG. 6. In this example, the fiber lasers, 10 and 60, are each co-doped along their lengths with Nd and Yb in a manner similar to FIG. 4. Here, four pump signals, $P_1$ to $P_4$, are utilized to pump the fiber lasers. In this example, pump signals, $P_1$ and $P_3$, have wavelengths of 800 nm, and pump signals, $P_2$ and $P_4$, have wavelengths of 940 nm. Two pump signals, $P_1$ and $P_2$, are coupled to a first multiplexer, 71, and the other pump signals, $P_3$ and $P_4$, are coupled to a second multiplexer, 72. The outputs of each multiplexer, 71 and 72, are coupled to respective ports of a coupler, 65, such as used in FIG. 6. Because of this coupling scheme, each fiber laser, 10 and 60, will be pumped by all four pump signals, $P_1$–$P_4$. The output of the laser, 10, which is coupled to path A, may have a wavelength of 1060 nm, and the output of the laser, 60, which is coupled to path B, may have a wavelength of 1050 nm. This scheme provides (1) increased pump power and (2) pump redundancy in case one of the pumps were to fail. The scheme also results in extended laser lifetime by operating the pump to a lesser power level and therefore increases the reliability of the amplifier.

Figure 8:
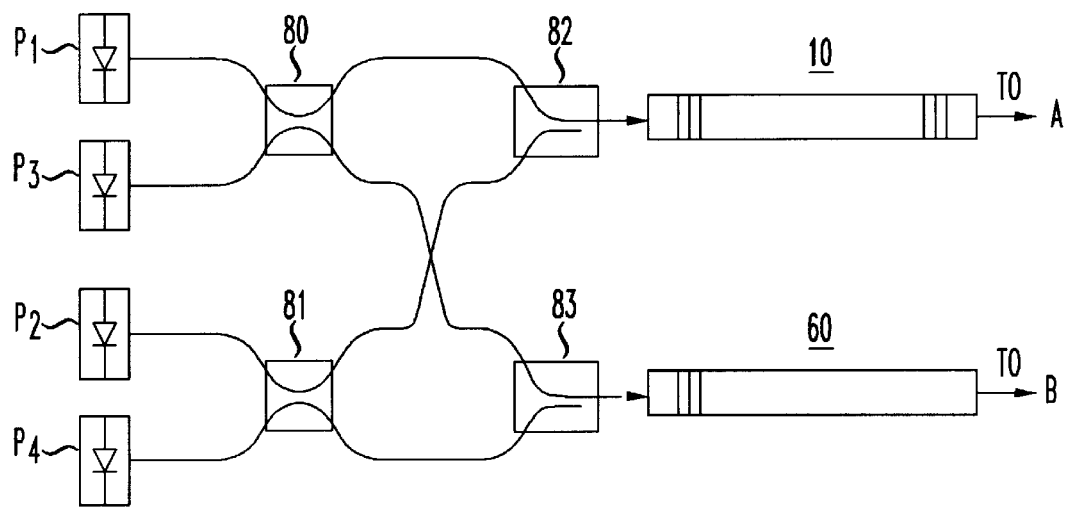

FIG. 8 illustrates a further alternative for pumping the fiber amplifier which alternative also uses four pump signals, $P_1$–$P_4$, incident on the fiber lasers, 10 and 60. Here, however, the pumps are arranged so that pumps $P_1$ and $P_3$ are coupled to a first coupler, 80, and the pumps $P_2$ and $P_4$ are coupled to a second coupler, 81. One output of first coupler 80 is coupled to a port of a first multiplexer, 82, and the second output of coupler 80 is coupled to a port of a second wavelength multiplexer, 83. Similarly, the outputs of coupler, 81, are coupled to respective other ports of the multiplexers 82 and 83. The outputs of the multiplexers, 82 and 83, are coupled to respective fiber lasers, 10 and 60, so that each laser receives all four pump signals.

Figure 9:
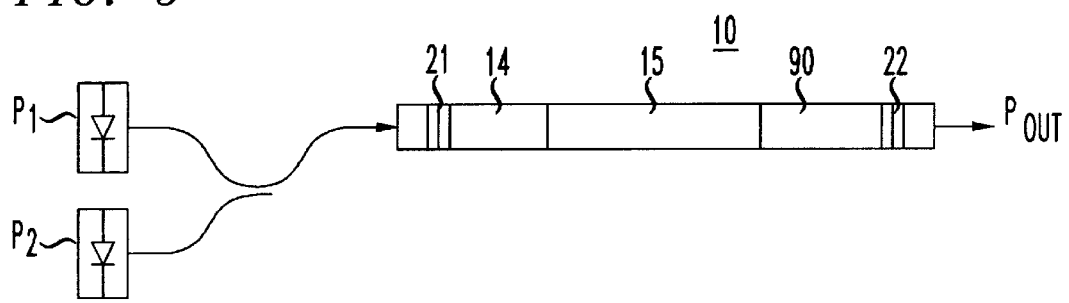

As illustrated in FIG. 9, the invention may employ more than two fiber sections in the fiber laser. In particular, the first fiber section, 14, is doped with Nd ions, and the second section, 15, is doped with Yb ions as before. Contiguous with the second section, 15, is a third section, 90, which is also doped with Nd ions, typically with a concentration within the range of 100 to 1000 ppm. The gratings, 21 and 22, are again placed at opposite ends of the fiber, 10. The advantage of this embodiment is that any light from the pump signal, $P_1$ or $P_2$ which is intended to pump the first section, 14, and is not absorbed, will be absorbed in the third section, 22.

The invention claimed is:

1. An optical fiber laser comprising:
   a core including a first and second dopant;
   a cladding surrounding the core; and
   means for introducing into the cladding first and second pump signals of two different wavelengths, the dopants and wavelengths being chosen so that each dopant absorbs only a different one of the pump signals.

2. The laser according to claim 1 wherein the first dopant is Nd and the second dopant is Yb.

3. The laser according to claim 2 wherein the wavelength of the first pump signal is approximately 800 nm, and the wavelength of the second pump signal is approximately 940 nm.

4. The laser according to claim 1 wherein the two dopants are distributed along the same length of the core.

5. The laser according to claim 1 wherein the first dopant is distributed along a first section of the core, and the second dopant is distributed along a second section of the core which is contiguous with the first section.

6. The laser according to claim 5 wherein the first dopant is also distributed along a third section of the core which is contiguous with the second section.

7. The laser according to claim 1 wherein the means for introducing the pump signals includes a first and second source of the first and second pump signals, respectively, and a multiplexer having inputs coupled to the sources and an output coupled to the cladding.

8. The laser according to claim 1 further comprising a pair of reflective means formed in the core.

9. The laser according to claim 8 wherein the reflective means comprises a pair of Bragg gratings.

10. The laser according to claim 8 wherein each of the reflective means is formed near opposite ends of the fiber.

11. The laser according to claim 8 wherein the reflective means are formed in close proximity near one end of the fiber.

12. An optical fiber amplifier system comprising a doped fiber section capable of amplifying an input message signal and means for pumping the doped fiber section, said means for pumping comprising:

a core including a first and second dopant;

a cladding surrounding the core;

means for introducing into the cladding first and second pump signals of two different wavelengths, the dopants and wavelengths being chosen so that each dopant absorbs only a different one of the pump signals; and means for coupling the output from the core to the doped fiber section.

13. The system according to claim 12 further comprising a second core including the first and second dopant surrounded by a second cladding, and means for introducing the first and second pump signals into both claddings.

14. The system according to claim 13 wherein the means for introducing the pump signals comprises an optical coupler.

15. The system according to claim 14 wherein the means for introducing the pump signals further comprises a multiplexer.

16. An optical fiber laser comprising:

a core including a first dopant of Nd and a second dopant of Yb;

a cladding surrounding the core; and first and second sources of first and second pump signals having different wavelengths coupled to the cladding so that each dopant absorbs only a different one of the pump signals.

17. An optical fiber amplifier system comprising a doped fiber section capable of amplifying an input message signal and an optical fiber laser coupled to the doped fiber section, the optical fiber laser comprising:

a core including a first dopant of Nd and a second dopant of Yb;

a cladding surrounding the core; and first and second sources of first and second pump signals having different wavelengths coupled to the cladding so that each dopant absorbs only a different one of the pump signals.

18. An optical fiber laser comprising:

a core including a first and second dopant;

a cladding surrounding the core; and first and second sources of first and second pump signals having different wavelengths coupled to the cladding, the dopants and wavelengths being chosen so that each dopant absorbs only a different one of the wavelengths.

19. An optical fiber laser according to claim 18 wherein the first dopant is Nd and the second dopant is Yb.

20. An optical fiber amplifier system comprising a doped fiber section capable of amplifying an input message signal and an optical fiber laser coupled to the doped fiber section, the optical fiber laser comprising:

a core including a first and second dopant;

a cladding surrounding the core; and first and second sources of first and second pump signals having different wavelengths coupled to the cladding so that each dopant absorbs only a different one of the pump signals.

21. An optical fiber amplifyer system according to claim 20 wherein the first dopant is Nd and the second dopant is Yb.

22. A method for operating an optical fiber laser which includes a core having a first and second dopant and a cladding surrounding the core, the method comprising the step of introducing into the cladding first and second pump signals of two different wavelengths, the dopants and wavelengths being chosen so that each dopant absorbs only a different one of the pump signals.

23. The method according to claim 22 wherein the first dopant is Nd and the second dopant is Yb.

* * * * *